March 22, 1949. G. E. RIEDER 2,465,266
VEGETABLE SLICER
Filed July 17, 1946 3 Sheets-Sheet 1
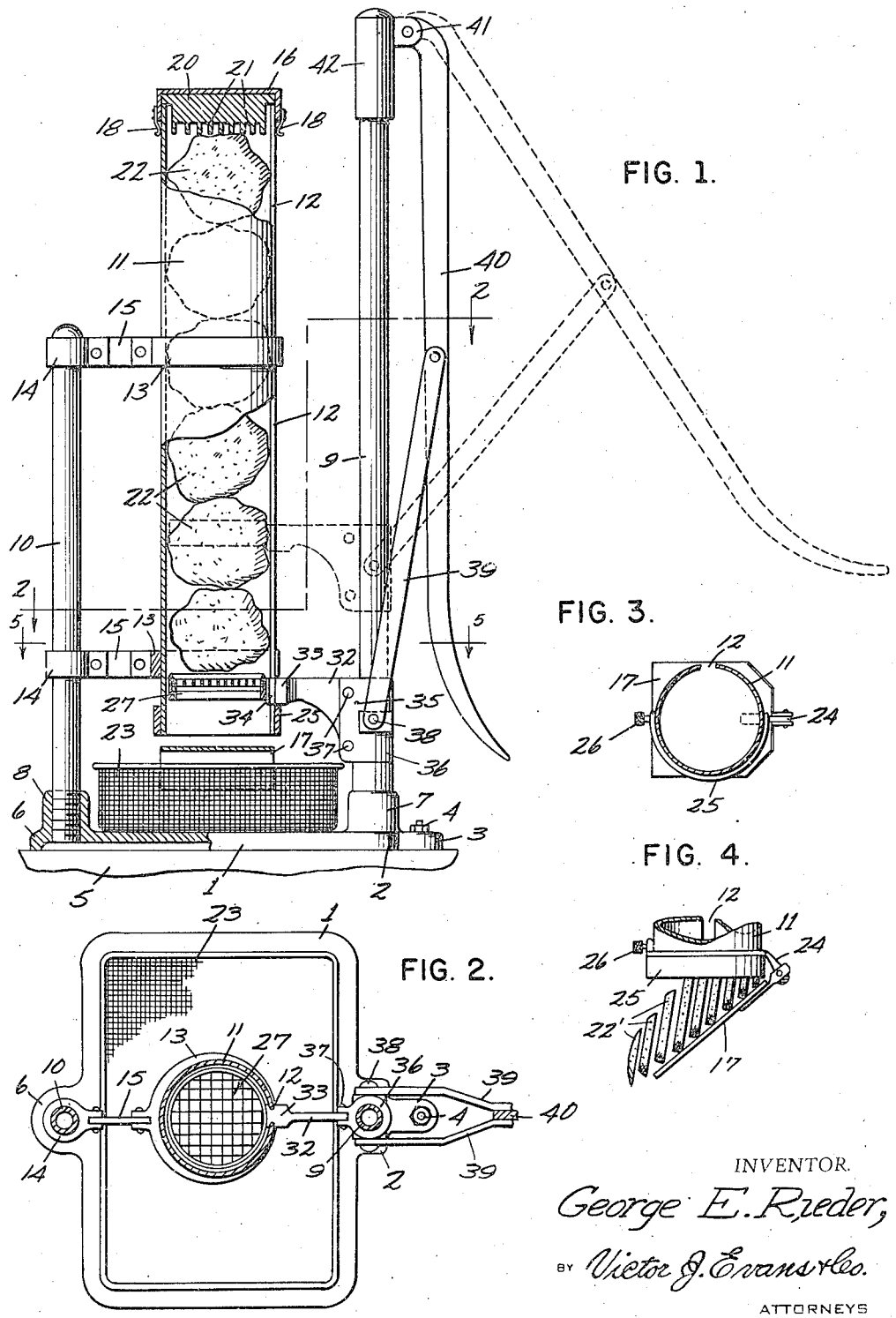
INVENTOR.
George E. Rieder,
BY Victor J. Evans & Co.
ATTORNEYS

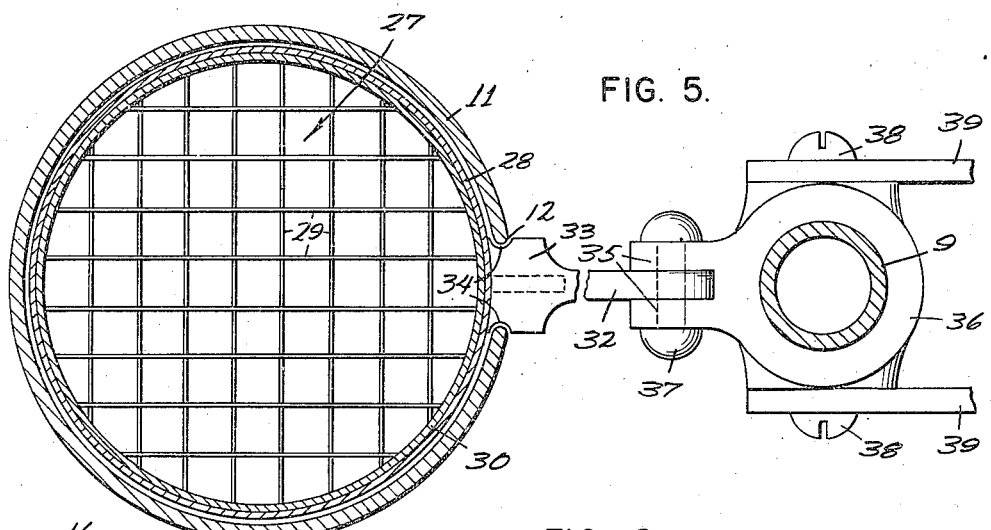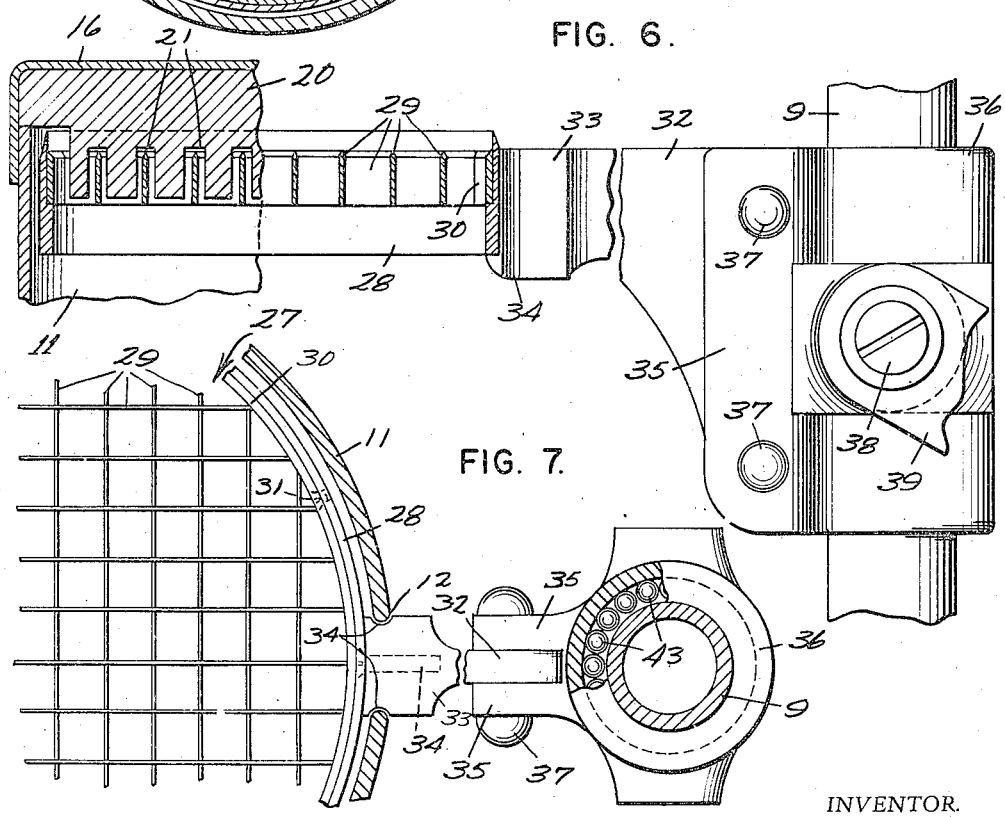

March 22, 1949.  G. E. RIEDER  2,465,266
VEGETABLE SLICER
Filed July 17, 1946  3 Sheets-Sheet 3

INVENTOR.
George E. Rieder,
BY Victor J. Evans & Co.
ATTORNEYS

Patented Mar. 22, 1949

2,465,266

UNITED STATES PATENT OFFICE 2,465,266

VEGETABLE SLICER

George E. Rieder, Houston, Tex.

Application July 17, 1946, Serial No. 684,205

2 Claims. (Cl. 146—160)

This invention relates to a vegetable cutter and it is one object of the invention to provide a cutter of such construction that potatoes or other vegetables may be placed in a container one upon another and quickly cut to form strips or slices of predetermined size and shape.

Another object of the invention is to provide a cutting apparatus wherein the vegetables to be cut are fed into a cylindrical or tubular container through the top thereof and blades moved upwardly through the container to cut the vegetables as they move upwardly through the container, the cut vegetables being then discharged through the lower end of the container when a door closing its lower end is moved to an opened position.

Another object of the invention is to provide a cutting apparatus wherein the cutting blades are carried by a frame having a bracket slidable vertically upon a standard and connected with an operating lever by means of which the bracket is shifted vertically along the standard.

Another object of the invention is to so associate the blade-holding frame with the tubular container that it will be guided during vertical movement and prevented from tilting and becoming jammed in the container.

Another object of the invention is to provide a vegetable cutter adapted to be mounted upon a table and firmly held in place while it is in use.

Another object of the invention is to provide the tubular container with a cover for its upper end carrying a block which will limit upward movement of the blade-holding frame without dulling sharpened upper edges of the blades.

Another object of the invention is to provide a vegetable cutter which is simple in construction, easy to operate and by means of which a comparatively large number of vegetables may be cut during one operation of the device.

The invention is illustrated in the accompanying drawings wherein:

Figure 1 is a side elevation of a vegetable cutter of the improved construction.

Figure 2 is a view taken along line 2—2 of Figure 1.

Figure 3 is a sectional view taken transversely through the container.

Figure 4 is a fragmentary view showing the lower portion of the container with its door or closure swung downwardly to an opened position.

Figure 5 is a sectional view upon an enlarged scale taken along the line 5—5 of Figure 1.

Figure 6 is a fragmentary view partially in section and partially in elevation showing the cutting frame in its raised position.

Figure 7 is a sectional view taken through a portion of the cutter frame and associated parts.

Figures 8, 9, 10, 11:
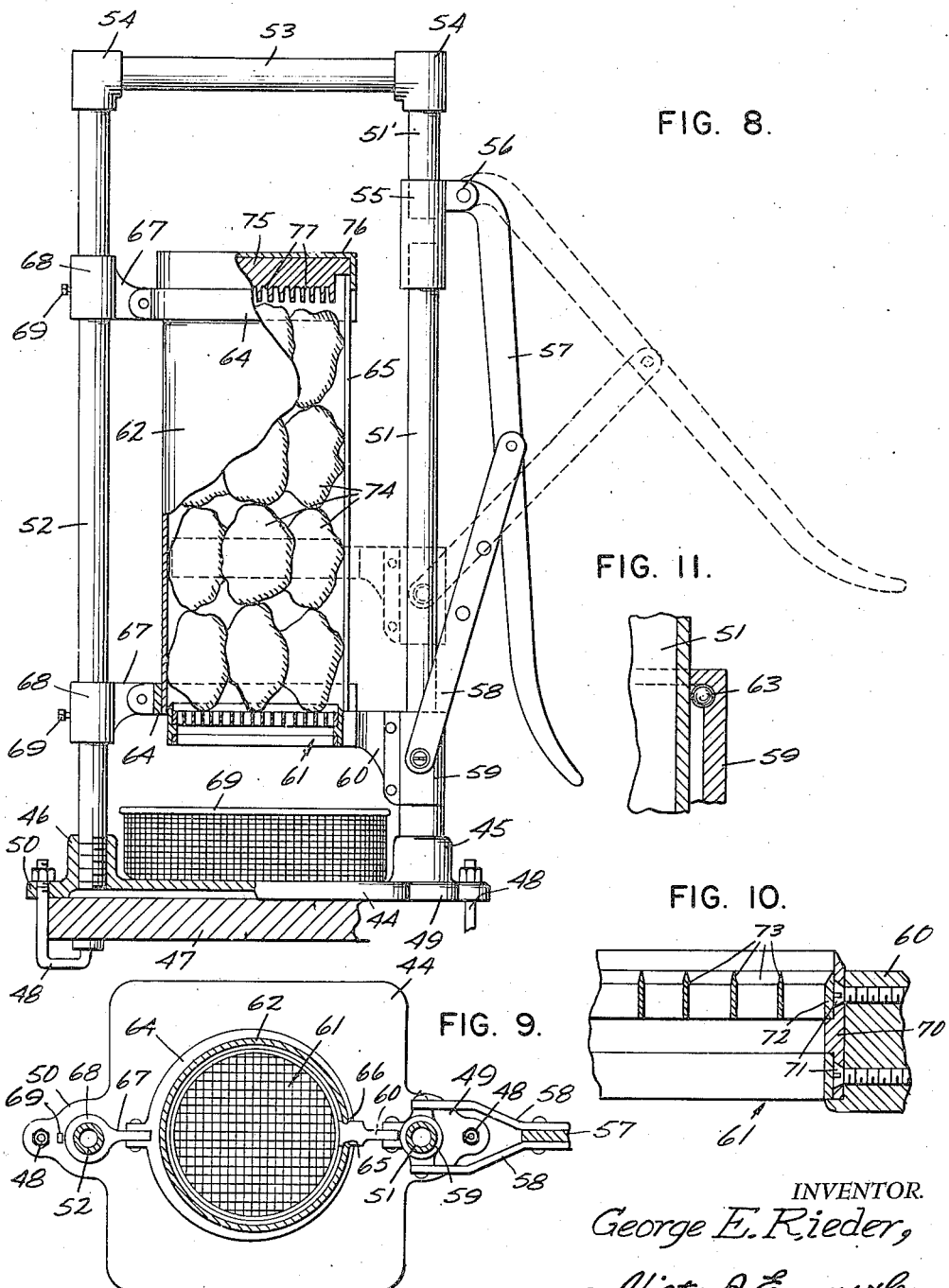
Figure 8 is a view showing a vegetable cutter of modified formation partially in side elevation and partially in section.
Figure 9 is a sectional view taken transversely through the vegetable cutter shown in Figure 8.
Figure 10 is a view showing a portion of the cutting frame in transverse section.
Figure 11 is a fragmentary sectional view of one of the standards and a portion of the sleeve of the mounting bracket for the cutter frame.

The improved vegetable cutter shown in Figure 1 has a base 1 which is formed midway the length of its rear side edge with an extension 2 and a tongue 3, the tongue being perforated to receive a bolt or other suitable fastener 4 by means of which the base is secured flat upon table 5, it being understood that other means may be provided for securing the base to the table if so desired. An extension 6 projects forwardly from the base opposite the extension 2 and these extensions 2 and 6 carry upstanding internally threaded sockets 7 and 8 into which are screwed standards 9 and 10, the standard 9 being of appreciably greater height than the standard 10. The standard 10 constitutes a support for a vertically disposed tubular container 11 which is open at its upper and lower ends and formed with a longitudinally extending slot 12 along its rear portion, and referring to Figures 1 and 2, it will be seen that the container is held by upper and lower clamps 13 connected with collars or brackets 14 by strips 15. The collars or brackets fit tightly about the standard 10, and the strips 15 are of such length that the container is supported over the central portion of the base 1. The clamps 13 are split, and ends of their arms terminate flush with opposite side edges of the slot 12 of the container.

Both ends of the container are open, and in order to normally close them, there have been provided a cap 16 for the upper end of the container and a movable metal stacking plate 17 for its lower end. The cap 16 fits snugly about the container, and is removably held in place by fasteners 18, and within the cap is mounted a wooden block 20 having its under face formed with a plurality of grooves 21. When the cap is removed, a number of potatoes or other vegetables 22 may be dropped into the container, and rest one upon another. After the vegetables have been cut, the stacking plate 17 is opened and the sliced vegetables pass out of the container and into a basket 23 placed upon the base. The stacking plate 17 has swinging movement to open and closed positions, and is pivoted to an ear 24 projecting from an end of a clamp 25 which fits about the lower end of the container for a portion of the circumference thereof, and is secured by a set screw 26, as shown in Figures 3 and 4. This stacking plate is provided to facilitate the stacking of cut vegetables in the basket 23 for further handling. Thus by tilting the stacking plate to the position shown in Figure 4, the slices 22' of vegetable may slide downwardly along the stacking plate and into the tray or basket in proper position for reloading of the stacks of slices for the secondary or cubing operation.

In order to cut the vegetables into slices, there has been provided a cutter assembly 27 having a circular frame 28 carrying blades 29, and of such diameter that it may be shifted vertically through the container. The blades are arranged as shown in Figures 5, 6 and 7, and are secured at their ends to a ring 30 which fits snugly within the circular frame 28 and is secured therein by a suitable number of screws 31. A shank or arm 32 has its thickened inner end portion 33 secured to the frame 28 by a screw 34 and at opposite sides formed with vertical grooves 34 so that when the head or inner end portion of the shank is passed through the slot 12 of the container edge portion of the container will engage in the grooves and guide vertical movement of the slicer assembly in the container. The outer end portion of the shank or arm 32 is enlarged and extended downwardly and this outer end portion is secured between the leaves 35 of a sleeve 36 by rivets 37. The sleeve and its leaves constitute a bracket which fits about and is slidable vertically along the standard 9 and at its opposite sides the sleeve is outwardly thickened and carries screws constituting pivot pins for pivotally connecting links or strips 39 with the sleeve. These strips have their outer ends pivoted to opposite sides of a lever 40 which extends longitudinally of the standard 9 and has its upper end pivoted to the ears 41 which project radially from a cap 42 applied to the upper end of the standard, and from an inspection of Figure 1 it will be seen that when the lever is grasped and swung upwardly the cutter assembly 27 will be shifted upwardly in the container and the blades caused to pass through the vegetables in the container between the cutter assembly and the cover for the upper end of the container and cut the vegetables into slices or into thin strips rectangular in cross section according to the arrangement of the blades. The blades enter the grooves 21 of the block when upward movement of the cutter assembly is stopped by engagement with the block and therefore the blades wil not be dulled. At its ends the sleeve is provided internally with bearing balls 43 which engage the standard and cause the sleeves to slide easily along the standard.

In Figures 8 through 11 there has been shown a vegetable slicer of a modified construction. This vegetable slicer is of greater capacity than the vegetable cutter shown in Figures 1 through 7 and while it is of the same general construction it has specific differences. The base 44 which corresponds to base 1 carries upstanding sockets 45 corresponding to the sockets 7 and 8 and is detachably secured to the table 47 by clamps 48 which pass through the extensions 49 and 50 of the base. Standards 51 and 52 are screwed into the sockets 45 and 46 and at their upper ends the two standards are connected by a cross bar 53 connected with the standards by elbow couplings 54. The standard 51 has an upper section 51' connected with its main section by a coupling 55 formed with hinge ears 56 to which a handle or lever 57 is pivotally connected and to this lever is pivoted links or strips 58 having their lower ends pivoted to opposite sides of a sleeve 59. The sleeve 59 slides vertically upon the standard 51 when the lever is moved and this sleeve has attached to it the shank 60 of a cutting unit 61 which fits within the vertically disposed tubular vegetable container 62. Bearing balls 63 which are mounted in ends of the sleeve 59 cause the sleeve to slide freely along the standard. The container is supported by circular clamping rings 64 which are split and have their ends terminating flush with side edges of the slot 65 formed vertically through the container and ends of the clamping rings engage in grooves 66 formed in opposite side faces of the shank to guide vertical movement of the cutting unit. The clamps 64 are secured to the arms 67 of sleeves 68 which fit about the standard 52 and carry set screws 69 by means of which the sleeves are secured in fixed positions upon the standard. By shifting the brackets formed by the sleeves and their arms along the standard 52 and then tightening the set screws the container may be firmly held in a vertically adjusted position with its lower end spaced upwardly a desired distance from the basket 69 which rests upon the base 44. The cutting unit 69 is similar to the cutting unit 27 and has a circular frame 70 secured to the shank 60 by screws 71. Within the circular frame 70 is mounted a ring 72 carrying blades 73 and from an inspection of Figure 8 it will be understood that as the cutting unit is moved upwardly the blades will cut the potatoes or other vegetables 74 into strips rectangular in cross section. Upward movement of the cutting unit is stopped by contact with a wooden block 75 mounted in the cap 76 which closes the upper end of the container and since this block is formed with grooves 77 in its under face to receive the blades, dulling of the blades will be prevented.

Having thus described the invention what is claimed is:

1. A vegetable slicer comprising a base, a tubular container adjustably supported vertically over said base and open at upper and lower ends and formed with a longitudinally extending slot, a standard rising from said base, a sleeve slidable vertically along said standard, a cutting unit slidable vertically in said container and having a circular frame fitting snugly within the container and provided with a shank passing through the slot and connected with said sleeve, a ring mounted in said frame, spaced cutter blades carried by said ring and sharpened along their upper edges, a cap for the upper end of said container, a block carried by said cap for limiting upward movement of the cutting unit and formed with grooves for receiving the sharpened upper edges of the blades, a cap for said standard having hinge ears projecting therefrom, a lever pivoted to the hinge ears and strips pivoted to the lever and to opposite sides of the sleeve for shifting the sleeve vertically along the standard and moving the cutting unit vertically in the container when the lever is moved.

2. A vegetable cutter comprising a base, relatively spaced standards rising from the base, an upright container located between the standards and supported from one of them with its lower end spaced upwardly from the base, the ends of the container being open and the container being provided with a vertical slot facing the other upright, a closure for the upper end of the said container, a cutter positioned in the container and mounted for movement upwardly or downwardly with relation thereto, a sleeve slidable on said other standard, a member passing through the slot of the container and supporting the cutter from the sleeve, a lever pivoted at one end to said other standard, and link means pivoted to the sleeve and to the lever between the ends of the latter, said lever and link means constituting means by which the cutter may be moved upwardly or downwardly with relation to the container.

GEORGE E. RIEDER.

REFERENCES CITED

The following references are of record in the file of this patent:

UNITED STATES PATENTS

| Number | Name | Date |
|---|---|---|
| 2,209,295 | Hjelte | July 23, 1940 |
| 2,210,765 | Mahlke | Aug. 6, 1940 |
| 2,219,963 | Rieder | Oct. 29, 1940 |

FOREIGN PATENTS

| Number | Country | Date |
|---|---|---|
| 51,615 | Switzerland | Nov. 24, 1910 |